Patented June 17, 1924.

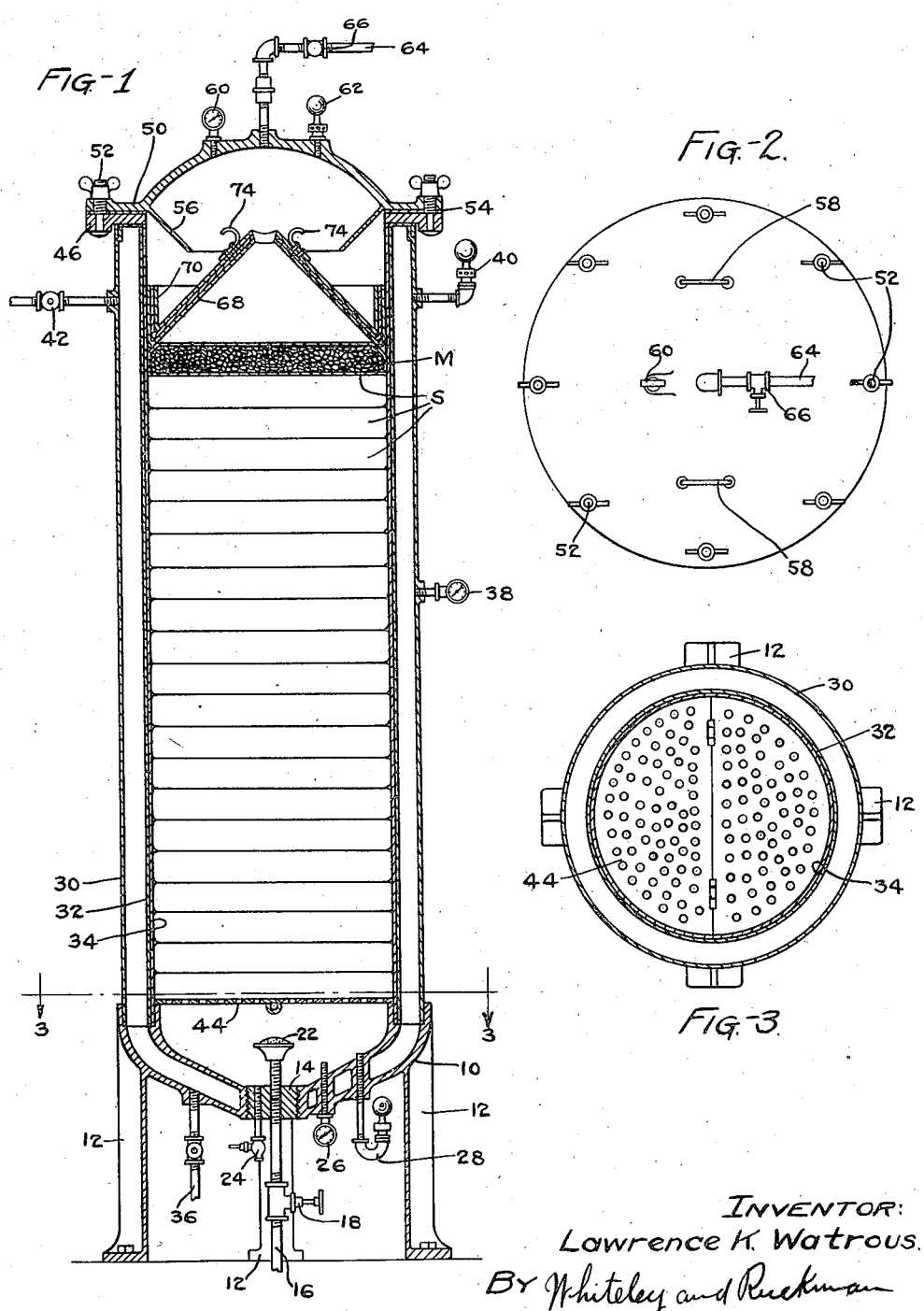

1,498,410

UNITED STATES PATENT OFFICE.

LAWRENCE K. WATROUS, OF MINNEAPOLIS, MINNESOTA.

APPARATUS FOR TREATMENT OF GREEN COFFEE, SHELLED PEANUTS, OR OTHER NUTS TO BE ROASTED, DRIED BEANS, PEAS, SMALL GRAINS, ETC.

Application filed September 19, 1922. Serial No. 589,113.

*To all whom it may concern:*

Be it known that I, LAWRENCE K. WATROUS, a citizen of the United States, residing at Minneapolis, in the county of Hennepin and State of Minnesota, have invented certain new and useful Improvements in apparatus for treatment of green coffee, shelled peanuts, or other nuts to be roasted, dried beans, peas, small grains, etc., of which the following is a specification.

My invention relates to an apparatus for treatment of green coffee, shelled peanuts or other nuts to be roasted, dried beans, peas, small grain, etc. An object is to provide an apparatus having a receptacle in which raw products are subjected to steam under high pressure for the purpose of removing undesirable qualities. The steam under high pressure is allowed to enter such receptacle and forces its way through green coffee or other products contained in loosely woven sacks or bags placed in layers in the receptacle. The steam after penetrating through the material being treated finds an exhaust at a suitable place in the receptacle through a pipe which may be associated with a cold water coil so that the exhausted steam is condensed back to a liquid. The duration of treatment is in accordance with the nature of the product to be treated, the amount of load placed in the receptacle for treatment and the time necessary to bring about the desired change in the character of the product. This change so far as I am at present able to ascertain involves hydrolysis of vegetable fat and proteid enzymes by catalytic action and the transformation of such enzymes and other chemical agents. In the case of green coffee such hydrolysis or catalysis of enzymes sets up a ferment which in turn kills or neutralizes or sterilizes the coffee germ of reproduction and other unknown agencies of deterioration in roasted coffee and so prevents natural fermentation or decomposition in roasted coffee which always takes place after roasting if enzymes and germs are not neutralized, destroyed or removed as in accordance with action of above described process. Green coffee treated in accordance with the process as described for a proper period of time for age, character, moisture contents, etc., loses its ability to become stale and bitter when roasted and remains fresh in flavor for an indefinite time which is not the case with roasted coffee not so treated.

Green coffee when so treated and roasted becomes velvety in smoothness, and this method of treatment does not change its character of cup quality except to greatly improve it by removing objectionable materials or chemicals. By such treatment coffee so treated becomes a more delicious beverage and all over-stimulating elements are greatly modified. Further, by reason of the described treatment or removal of such enzymes, green coffee when so treated and roasted not only makes a delicious smooth cup of coffee with hard water, lime, or iron water but can be boiled in any water for any length of time without the usual harm to fineness of flavor which takes place in all roasted coffees not so treated or processed as described above. Coffee so treated proves economical in usage for the spent grounds can be used a second time by the addition of a small amount of fresh coffee and so brewed the second time produces a fine cup of coffee even though when boiled to excess, for treatment of the green coffee by this method or process has removed vegetable or chemical contents which quickly spoil the best of coffee when over-brewed, over-percolated or over-boiled which so quickly harms and spoils coffee not so treated and by reason of this prevailing danger in using ordinary roasted coffee (not processed as above) successful coffee-making is now a matter of long training and studied skill but with coffee treated by my process anyone can make a fine cup of coffee. By such treatment shelled nuts for roasting are likewise improved and made to remain fresh much longer than any not so treated, and dried beans, peas, small grains, etc. are likewise also greatly improved as food products for when so treated they are made sterile and the deteriorating chamical reaction which takes place during or after roasting or cooking is eliminated before it can become active. Food products and other articles so treated are more easily digested and less harmful to the human system. Food products so treated become modified, seasoned or mellowed as of age, and all bitter or astringent properties are removed.

The full objects and advantages of my invention will appear in connection with the detailed description, and the novel features embodied in my inventive idea will be particularly pointed out in the claims.

In the accompanying drawings which illustrate the application of my invention in one form, Fig. 1 is a view of the apparatus mostly in central vertical section. Fig. 2 is a top plan view. Fig. 3 is a view in horizontal section on the line 3—3 of Fig. 1.

Referring to the construction shown in the drawings, the numeral 10 designates a cup-shaped member which is provided with supporting legs 12. The central portion of the member 10 has a screw-threaded opening which is provided with a screw plug 14. A steam supply pipe 16 is provided with a shutoff valve 18, and this pipe extends through the plug 14 into a steam pressure chamber 20 where it terminates in a spraying nozzle 22. Connected with the steam chamber by tubes extending through the base are a drain cock 24, a pressure gauge 26, and a safety valve 28. The base 10 is hollow and open at its upturned periphery to provide two concentric margins to which are attached two concentric metal shells 30 and 32, the inner shell 32 being lined with a glass tube 34. A steam supply pipe 36 supplies steam to the space in the hollow base and to the space between the concentric shells 30 and 32, the latter space being connected to a pressure gauge 38, and safety valve 40 and having an exhaust pipe 42 leading from the upper portion thereof. A separate perforated bottom 44 is provided for the glass tube 34. This bottom is preferably glass enameled and is made in two parts hinged together in such manner that when it is supported on the inner margin of the cupshaped base, it is maintained in horizontal condition, but may be collapsed upwardly when it is to be removed. Secured to the upper ends of the shells 30 and 32 is a horizontal flange 46. A dome or cover 48 has a horizontal flange 50 adapted to be secured to the flange 46 by bolts 52. A gasket 54 is interposed between the flanges to make a steam-tight joint. Depending from the cover 48 is a drip flange 56. The cover is provided with handles 58, a pressure gauge 60, a safety valve 62, and an exhaust pipe 64 having a shutoff valve 66. The glass lining 34 is adapted to receive a plurality of sacks S piled one on top of another and containing the material M which is to be treated. A drip cone 68 having a vertical concentric flange 70 is adapted to rest upon the upper one of the sacks S. This cone preferably consists of an intermediate piece of metal faced on both sides by glass, and it is provided with a central opening, for the escape of steam and with hooks 74 by means of which it may be removed.

The operation and advantages of my invention have already been set forth. The coffee or other product to be treated is placed in a plurality of sacks which are piled one on top of the other in the receptacle; the drip cone is placed upon the uppermost sack and the cover is secured in place. Steam under pressure is then admitted through the pipe 16 to the steam chamber 20 and after forcing its way through the material in the sacks finally escapes from the exhaust pipe 64 carrying with it the undesirable qualities of the material. Any condensate forming at the top of the apparatus is caught within the flange 70 and prevented from seeping back through the material which is being treated. Steam is admitted through the pipe 36 to the space between the shells 30 and 32, thereby heating the peripheries of the sacks and preventing condensate from forming. The provision of the glass lining prevents contamination of the material while it is being treated.

I claim:

1. Apparatus for treating green coffee, shelled nuts, dried beans, peas, small grain, etc., comprising a receptacle for receiving said products, a closure for said receptacle, an inwardly converging drip flange depending from said closure, a drip receiving member adapted to be placed on top of said products, said member having a central opening for passage of steam, and means for introducing steam under pressure into said receptacle.

2. Apparatus for treating green coffee, shelled nuts, dried beans, peas, small grain, etc., comprising a hollow cupshaped base member, a casing supported on said base member and having an internal diameter greater than that of the upper end of said base member whereby the latter forms an annular shoulder, a perforated partition adapted to rest upon said shoulder, said partition being hinged whereby it may be collapsed upwardly, said casing forming a receptacle for receiving said products, a closure for said receptacle, and a steampipe extending through said cupshaped member for delivering steam underneath said partition.

In testimony whereof I hereunto affix my signature.

LAWRENCE K. WATROUS.